United States Patent
Letoffe et al.

[11] Patent Number: 6,124,235
[45] Date of Patent: Sep. 26, 2000

[54] ACCELERATOR SYSTEM FOR CROSSLINKING POLYMERS WHICH HARDEN ON EXPOSURE TO THE MOISTURE IN AIR

[75] Inventors: Michel Letoffe, Sainte Foy les Lyon, France; Jean-Marc Pujol, Princeton Junction, N.J.

[73] Assignee: Rhone-Poulenc Chimie, Courbevoie Cedex, France

[21] Appl. No.: 08/888,323

[22] Filed: Jul. 3, 1997

Related U.S. Application Data

[62] Division of application No. 08/310,098, Sep. 22, 1994, Pat. No. 5,681,884.

[30] Foreign Application Priority Data

Sep. 22, 1993 [FR] France ................................. 93 11263

[51] Int. Cl.$^7$ ............................. B01J 23/00; B01J 21/02; B01J 21/08; B01J 23/32
[52] U.S. Cl. ..................... 502/349; 502/202; 502/208; 502/236; 502/239; 502/241; 502/242; 502/243; 502/324; 502/350
[58] Field of Search ................... 502/236, 239, 502/241, 242, 243, 349, 350, 324, 202, 208

[56] References Cited

U.S. PATENT DOCUMENTS

| 4,508,888 | 4/1985 | Letoffe et al. ........................ 528/23 |
| 5,264,515 | 11/1993 | Cody et al. ........................ 528/10 |
| 5,356,980 | 10/1994 | Feder et al. ........................ 524/405 |

FOREIGN PATENT DOCUMENTS

| 0 117 772 | 9/1984 | European Pat. Off. . |
| 0 332 785 | 9/1989 | European Pat. Off. . |
| 0 446 157 | 9/1991 | European Pat. Off. . |
| 0 548 847 | 6/1993 | European Pat. Off. . |

*Primary Examiner*—C. Melissa Koslow
*Assistant Examiner*—Patricia L. Hailey
*Attorney, Agent, or Firm*—Burns, Doane, Swecker & Mathis, L.L.P.

[57] ABSTRACT

An accelerator system for the cold crosslinking of polymers which harden on exposure to moisture by hydrolysis/condensation, comprising: (C) x parts by weight of a catalyst for crosslinking the said polymers by polycondensation, x ranging from 0.01 to 10; (E) Y parts by weight of a solid inorganic compound containing an amount y of water in the form of water of hydration and/or water adsorbed by capillary condensation, this amount y ranging from 0.5 to 40 parts by weight, and which can represent up to 70% of the weight of the said solid inorganic compound; (F) z parts by weight of fillers, z ranging from 0 to 50; (D) 100-(x+Y+z) parts by weight of a diluent or of a solvent of the said catalyst (C), the diluent or solvent having a dynamic viscosity at 25° C. of the order of 50 to 200,000 mPa.s; the respective amounts of the four constituents (C), (E), (F) and (D) being such that the system obtained exists in the form of a manipulable paste. The accelerator system is used for accelerating silicone compositions which harden on exposure to the moisture in air.

7 Claims, 10 Drawing Sheets

ACCELERATOR SYSTEM FOR CROSSLINKING POLYMERS WHICH HARDEN ON EXPOSURE TO THE MOISTURE IN AIR

This application is a divisional, of application Ser. No. 08/310,098, filed Sep. 22, 1994, now U.S. Pat. No. 5,681,884.

The subject of the present invention is a new accelerator system for crosslinking polymers which harden on exposure to moisture by a polycondensation reaction and the use of the said system for the manufacture of so-called "neutral" adhesives and mastics by cold crosslinking of polyorganosiloxanes containing alkoxysilyl or ketiminoxysilyl functional groups.

Single-component silicone compositions used as mastics or adhesives crosslink while cold according to a mechanism of hydrolysis of reactive functional groups of acetoxysilane, ketiminoxysilane or alkoxysilane type or the like, followed by condensation reactions between silanol groups formed and other residual reactive functional groups. Hydrolysis is generally carried out by virtue of water vapour which diffuses into the material from the surface exposed to the atmosphere. When the thickness of the said material is large, the time required to crosslink the unexposed face can be significant; thus, it generally requires more than 100 hours to crosslink a seal with a thickness of 10 mm.

In certain applications, such as, for example, technical mastics for insulating glazings or bondings for automobile components, it is important to have available a rapid-setting material. It has been proposed to add hardening accelerators to acetoxy (and generally acyloxy) silicone compositions which crosslink while cold, especially hardening accelerators of the type:

anhydrous or hydrated alkali metal or alkaline-earth metal phosphates, to be added at the time of use (U.S. Pat. No. 4,508,888);

alkali metal or alkaline-earth metal hydroxides, to be added at the time of use (U.S. Pat. No. 4,532,315); the most efficient systems are alkaline-earth metal hydroxides, in particular lime, which reacts with the acetic acid released by the silicone composition, giving water and sodium acetate; the water produced by the reaction leads to the hydrolysis of the acetoxy functional groups, which brings about the formation of twice as much acetic acid as at the start; the reaction thus continues in self-accelerating; the setting can thus be very fast.

hydrogels based on organic polymers swollen with water, and added at the time of use (U.S. Pat. No. 4,918,121). It has also been proposed (EP-A-372,347) to accelerate acetoxy silicone compositions by addition of a system based on an emulsion of water in a silicone oil. The use is also known (British Patent 1,308,985) of molecular sieves to control the rate of crosslinking of acetoxy silicone elastomer compositions.

There are fields of application where neutral hardenable silicone compositions (that is to say, non-acyloxy) are preferred to acidic compositions (that is to say, acyloxy); this is especially the case as regards the production:

of coatings on metals such as iron, zinc, copper and the like or on treated glasses, which corrode on contact with acids;

of coatings on concrete, where the formation of blooming is observed;

of seals for housings containing electronic equipment which is sensitive to acids.

In all these applications, it may be advantageous to have available rapid-setting neutral hardenable silicone compositions.

It was observed that increasing the amount of catalyst in neutral hardenable silicone compositions only has a small amount of influence on the in-depth crosslinking rate. On the other hand, the addition of free water to the formulation causes a strong acceleration at the start of the crosslinking but leads to a soft and tacky, and therefore incompletely crosslinked, elastomer; the addition of free water and a simultaneous increase in the concentration of catalyst lead to the same result.

Moreover, it was observed that the elastomers obtained from rapid-crosslinking silicone systems generally have a poorer adhesion than that of the elastomers arising from slow-crosslinking silicone systems. It is also known that tin-based catalysts are generally unstable in the presence of water.

It was proposed (U.S. Pat. No. 4,918,140) to accelerate neutral (ketiminoxy) silicone compositions by addition, to a part (A) containing the silicones to be crosslinked, of a part (B) containing a water-swollen organic polymer hydrogel; such a mixture must be carefully homogenized, as only the part (A) is capable of crosslinking when exposed to atmospheric moisture; moreover, the final material is tacky as it is insufficiently crosslinked.

The Applicant company has now found an accelerator system for the cold crosslinking of polymers which harden on exposure to moisture, especially neutral silicone elastomer compositions, the said system being stable with time and making it possible to obtain mastics or adhesives having an adhesion similar to that of slow-crosslinking neutral silicone elastomer compositions. The said accelerator system can also be used to accelerate the hardening of polyesters or of polyethers containing alkoxysilane functional groups or of polyurethanes.

The said accelerator system for the cold crosslinking of polymers which harden on exposure to moisture by hydrolysis/condensation is characterized in that it comprises:

(C) x parts by weight of a catalyst for crosslinking the said polymers by polycondensation, x ranging from 0.01 to 10 and preferably from 0.1 to 5;

(E) Y parts by weight of at least one solid inorganic compound containing an amount y of water in the form of water of hydration and/or water adsorbed by capillary condensation, this amount y ranging from 0.5 to 40 parts by weight, preferably from 3 to 20 parts by weight, and which can represent up to 70% of the weight of the said solid inorganic compound;

(F) z parts by weight of fillers, z ranging from 0 to 50 and preferably from 1 to 30;

(D) 100-(x+Y+z) parts by weight of a diluent or of a solvent of the said catalyst (C), the diluent or solvent having a dynamic viscosity at 25° C. of the order of 50 to 200,000 mPa.s.; the respective amounts of the four constituents (C), (E), (F) and (D) being such that the system obtained exists in the form of a manipulable paste.

Mention may be made, among crosslinking catalysts (C) which can be used, of those based on tin, titanium, zirconium, manganese, lead and the like such as:

organotin salts of carboxylic acids such as tin 2-ethylhexanoate, dibutyltin diacetate, dibutyltin dilaurate and the like (some of these catalysts are described in the work by Noll entitled "Chemistry and Technology of Silicones", page 397, 2nd paragraph—Academic Press, 1968)

reaction products of organotin salts of carboxylic acids with titanic esters (Patent U.S. Pat. No. 3,403,753)

tin chelates (Patent EP-B-147,323)

organic derivatives of titanium and of zirconium, such as titanic and zirconic esters (U.S. Pat. No. 4,525,565)

tin, zinc or lead octoates.

Mention may be made, among solid inorganic compounds (E) which can contain up to 70% of their weight of water of hydration and/or water adsorbed by capillary condensation, of:

hydrated crystalline alkali metal or alkaline-earth metal aluminosilicates (also known as zeolites and molecular sieves); these exist in the form of a crystal lattice containing interconnected cavities of uniform opening, forming pores capable of adsorbing significant amounts of water; mention may especially be made of zeolites 4A containing from 4 to 22% by weight of water;

hydrated silica gels; these have a microporous structure which can retain significant amounts of water (for example up to 22% by weight) by capillary condensation;

hydrated inorganic salts containing water of crystallization, such as especially borates, phosphates, carbonates and the like of alkali metals or alkaline-earth metals such as sodium, calcium, magnesium or barium; mention may be made of $Na_2B_4O_7.10H_2O$ containing 47% by weight of water, $Na_2HPO_4.12H_2O$ containing 60% by weight of water or $Na_2CO_3.10H_2O$ containing 63% of water;

and the like.

Mention may be made, among diluents or solvents (D) of the said crosslinking catalyst (C), of α,ω-bis(triorganosiloxy)polydiorganosiloxanes formed essentially from diorganosiloxy units and from at least 1% by weight of monoorganosiloxy and/or siloxy units, the organic radicals bonded to the silicon atoms being chosen from $C_1$–$C_8$ alkyl, vinyl or phenyl radicals, at least 40% by weight of these radicals being methyl radicals and at most 10% being vinyl radicals;

optionally halogenated aromatic, cycloaliphatic or aliphatic hydrocarbons, such as n-heptane, n-octane, cyclohexane, methylcyclohexane, toluene, xylene, mesitylene, cumene, tetralin, perchloroethylene, trichloroethane, tetrachloroethane, chlorobenzene, ortho-dichlorobenzene and the like;

aliphatic and cycloaliphatic ketones such as methyl ethyl ketone, methyl isobutyl ketone, cyclohexanone, isophorone and the like;

esters such as ethyl acetate, butyl acetate, ethylene glycol acetate and the like.

The fillers (F) can be organic in nature (poly(vinyl chloride) powder, polyethylene powder and the like) or preferably inorganic in nature. These inorganic fillers can exist in the form of very finely divided products, with a mean diameter of less than 0.1 μm, such as combustion or precipitation silicates with a specific surface generally greater than 40 $m^2$/g, or in the form of coarsely divided products, with a mean diameter greater than 0.1 μm, such as ground quartz, diatomaceous silicas, calcium carbonate, calcined clay, carbon black, titanium oxide of rutile type, iron, zinc, chromium, zirconium or magnesium oxides, the various forms of alumina, boron nitride, lithopone or barium metaborate, with a specific surface generally less than 30 $m^2$/g; they can optionally be surface modified by the various silicon compounds normally used for this purpose (organochlorosilanes, organopolysiloxanes, organopolysilazanes and the like mentioned in FR-A-1,126,884, FR-A-1, 136,885, FR-A-1,236,505 or GB-A-1,024,234).

Although containing hydrolysable catalysts (tin or titanium salts and the like), it was observed that the accelerator system forming the subject of the invention is stable with time.

The latter is very particularly advantageous for accelerating silicone compositions which harden on exposure to the moisture in air, comprising by weight:

(H) 100 parts of an α,ω-di(hydroxy)diorganopolysiloxane, with a dynamic viscosity of the order of 500 to 500,000 mPa.s at 25° C., preferably of the order of 3000 to 200,000 mPa.s, consisting of a sequence of diorganopolysiloxy units of formula $R_2SiO$, in which formula the R symbols, which are identical or different, represent alkyl, alkenyl or aryl radicals containing from 1 to 8 carbon atoms, at least 80% by number of the said radicals preferably being methyl radicals;

(R) from 2 to 10 parts by weight, preferably from 4 to 8 parts by weight, of at least one crosslinking agent $RSiX_3$ or $SiX_4$, where R has the definition given above and X represents a hydrolyzable group;

(C') from 0.005 to 0.5 part by weight, preferably from 0.01 to 0.1 part by weight, of a catalyst for crosslinking by polycondensation;

(F') from 0 to 200 parts by weight, preferably from 3 to 100 parts by weight, of fillers.

The α,ω-di(hydroxy)diorganopolysiloxanes (H) are essentially linear products; they can, however, comprise up to 2% by number of $RSiO_{1.5}$ and/or $SiO_2$ units with respect to the number of diorganosiloxy units. The dynamic viscosities mentioned above are measured at 25° C. using a Brookfield viscometer according to AFNOR Standard NFT 76 102 of February 1972. Mention may be made, among the hydrocarbon radicals R, of the radicals:

methyl, ethyl, propyl, 3,3,3-trifluoropropyl, cyclohexyl, cyanoethyl and the like vinyl, allyl, butenyl and the like phenyl, chlorophenyl and the like. It must be understood, according to a variant of the invention, that copolymers or a mixture consisting of a number of polymers which differ from each other in molecular weight and/or the nature of the radicals bonded to the silicon can also be used as polymer (H).

The crosslinking agent (R) has at least one hydrolysable group such as:

acyloxy of formula —O-CO-R' alkoxy of formula —O-R' amino of formula —$NR^1R^2$ amido of formula —$NR^1COR^2$ alkenyloxy of formula —O—$CR^1$=$CHR^2$ aminoxy of formula —O—NR $R^2$ ketiminoxy of formula —O—N=$CR^1R^2$ or where R' represents an alkyl or aryl radical having from 1 to 15 carbon atoms, $R^1$ and $R^2$, which are identical or different, represent alkyl or aryl radicals containing from 1 to 8 carbon atoms and T an alkylene radical containing from 4 to 8 carbon atoms. Mention may very particularly be made, among the radicals R', $R^1$ and $R^2$, of the methyl, ethyl, cyclohexyl or phenyl radicals and the like. Mention may very particularly be made, among the radicals T, of those of formula —$(CH_2)_4$—, —$(CH_2)_5$—, —$(CH_2)_6$— and the like. The crosslinking agents preferentially used are alkoxysilanes and ketiminoxysilanes. Mention may be made, as examples of alkoxysilanes, of those of formula Mention may be made, as examples of ketiminoxysilanes, of those of formula The acyloxysilane crosslinking agents are also advantageous. Mention may be made, as examples of acyloxysilanes, of those of formula The catalyst (C') which can be used has the same definition as that of the catalyst (C) present in the accelerator system. The said catalysts (C) and (C') can be identical or different. According to a variant of the invention, the said catalyst (C') can be omitted from the silicone composition as defined above when homogenization of the said composition is sufficient; the amount of catalyst (C) in the accelerator system must then compensate for the lack of catalyst (C').

The fillers (F') which can be used have the same definition as those present in the accelerator system; they can be identical or different.

For a good implementation of the invention, the amount of accelerator system to be introduced into the silicone composition which crosslinks while cold is such that the amount of water present in the final composition is of the order of 0.1 to 4%, preferably of 0.3 to 2%, by weight.

The viscosity and the amount of diluent or solvent (D) in the accelerator system is a function of the nature and of the level of the inorganic filler (F) which it optionally contains, as well as of the viscosity of the silicone composition to be accelerated. The presence or absence of fillers (F) and the choice of these fillers is also a function of the viscosity of the silicone composition to be accelerated. For a good implementation of the invention, it is recommended to use an accelerator system whose dynamic viscosity at 25° C. is in the region of that of the silicone composition to be accelerated.

The use of the said accelerator system in silicone compositions which harden on exposure to the moisture in air makes it possible to obtain mastics or adhesives which set satisfactorily rapid even throughout the thickness, and which have good adhesion.

The silicone compositions which harden on exposure to the moisture in air described above can additionally contain conventional additive adjuvants, in particular thermal stabilizing agents (in particular ceric oxides and hydroxides) in a proportion of 0.1 to 12 parts per 100 parts of α,ω-di(hydroxy)-diorganopolysiloxane (H);

compounds which improve fire resistance (in particular organic and inorganic platinum derivatives);

silicone plasticizers such as α,ω-bis(triorgano-siloxy) polydiorganosiloxanes, with a dynamic viscosity of at least 10 mPa.s at 25° C., preferably of 10 to 1000 mPa.s at 25° C., formed essentially from is diorganosiloxy units and from at most 1% by weight of monoorganosiloxy and/or siloxy units, the organic radicals bonded to the silicon atoms being chosen from methyl, vinyl or phenyl radicals, at least 40% by weight of these radicals being methyl radicals and at most 10% being vinyl radicals; they are used in a proportion of 5 to 120 parts by weight per 100 parts of α,ω-di(hydroxy) diorganopolysiloxane (H);

organic plasticizers such as the products from the alkylation of benzene with long-chain olefins, with a molecular weight greater than 200, in a proportion of 0 to 50 parts by weight per 100 parts of α,ω-di(hydroxy) diorganopolysiloxane (H);

compounds contributing thixotropic properties such as
liquid branched methylpolysiloxane polymers having from 1.4 to 1.9 methyl radicals per silicon atom and consisting of a combination of units of formula $(CH_3)_3SiO_{1/2}$, $(CH_3)_2SiO$ and $CH_3SiO_{3/2}$; they contain from 0.1 to 8% of hydroxyl groups; they can be obtained by hydrolysis of the corresponding chlorosilanes; they are introduced in a proportion of 3 to 50 parts by weight per 100 parts of α,ω-di(hydroxy)-diorganopolysiloxane (H);

hydroxylated silicon compounds which are solid at room temperature such as diphenylsilanediol, dimethylphenylsilanediol and the like; they are used in a proportion of 0.5 to 20 parts by weight per 100 parts of α,ω-di(hydroxy)diorgano-polysiloxane (H);

oils which make it possible to reduce the overall viscosity such as α,ω-di(hydroxy)dimethylphenylpolysiloxane oils with a dynamic viscosity of the order of 200 to 600 mPa.s or α,ω-di(methoxy)- or -di(ethoxy)dimethylpolysiloxane oils with a dynamic viscosity of the order of 30 to 2000 mPa.s; they are used in a proportion of 2 to 40 parts by weight per 100 parts of α,ω-di(hydroxy) diorganopolysiloxane (H);

The adhesion to various substrates, such as wood, aluminium, concrete, PVC and the like, of the elastomer formed by hardening the silicone compositions described above can be further improved by addition, per 100 parts of the said composition, of 0.1 to 5 parts of at least one adhesion agent such as C$_1$—C$_{10}$ alkyl polysilicates (ethyl or methyl polysilicate)

alkoxysilanes of formula Z$_n$Si(OZ')$_{4-n}$ where

Z is a saturated or unsaturated C$_1$–C$_{10}$ hydrocarbon radical optionally containing nitrogen as a heteroatom

Z' is a C$_1$–C$_8$ alkyl radical or a C3–C6 alkoxyalkylene radical n is equal to 0 or 1. Mention may be made, by way of examples, of alkoxysilanes, vinylalkoxysilanes, (Δ$^2$-imidazolinyl)alkoxysilanes and aminoalkoxysilanes:

vinyltrimethoxysilane vinyltris(methoxyethoxy)silane tetra(methoxyethoxy)silane

- (C$_2$H$_5$O)$_3$Si(CH$_2$)$_3$NCH$_2$CH$_2$N=CH
- (C$_2$H$_5$O)$_3$Si(CH$_2$)$_3$NH$_2$
- CH$_3$(C$_2$H$_5$O)$_2$Si(CH$_2$)$_3$NH$_2$
- (CH$_3$O)$_3$Si(CH$_2$)$_3$NH(CH$_2$)$_2$NH$_2$

The silicone compositions which harden on exposure to the moisture in air and which contain the said accelerator system which forms the subject of the invention are prepared by simple mixing of the accelerator system with the other constituents of the composition, for example by manual mixing or using a static mixer or a pump or from a two-component cartridge equipped with a static mixer.

The said rapid-hardening compositions can be used in many applications such as pointing in the building industry, joining materials, insulating electrical conductors, coating electronic circuits or preparing moulds which are used in the manufacture of objects made of resin or synthetic foam. They are very particularly advantageous for any application which requires a rapid setting in thickness such as in the production of seals, especially of "in situ" seals used in the automobile industry ("flattened", "shaped" or "injected" seals) or in the manufacture of double glazings, of bonded external glazings or of seals for domestic electrical appliances.

Complete crosslinking after addition of the accelerator system requires approximately 1 to 24 hours.

The following examples are given by way of illustration and cannot be regarded as limiting the sphere or spirit of the invention.

EXAMPLES 1 to 15

An accelerator system for crosslinking while cold is prepared by dispersion, in a silicone oil, of the solid inorganic compound (E) containing water in the form of water of hydration and/or water adsorbed by capillary condensation, addition of the optional fillers (silica, calcium carbonate) and then the tin catalyst, and mixing. A pasty liquid accelerator system is thus obtained. The nature and the amounts of the various constituents of the accelerator system appear in Tables 1 and 2. In these tables, the various abbreviations or designations have the following meaning:

12% MS: zeolite 4A powder containing 12% by weight of water

22% MS: zeolite 4A powder containing 22% by weight of water silica gel: activated standard Levilite® 130754 marketed by Rhône-Poulenc Aqua Keep®: Aqua Keep® X5 T-S (alkali metal polyacrylate marketed by Norsolor, forming a hydrogel by addition of water)

47 V 30,000: polydimethylsiloxane oil with a dynamic viscosity at 25° C. of the order of 30,000 mPa.s 47 V 100: polydimethylsiloxane oil with a dynamic viscosity at 25° C. of the order of 100 mPa.s 48 V 3500: α,ω-di(hydroxy)polydimethyl-siloxane oil with a dynamic viscosity at 25° C. of the order of 3500 mPa.s silica: Aerosil® 150 silica with a BET surface of 150 m$^2$/g, marketed by Degussa DOctSnDL: dioctyltin dilaurate, Metatin® 812 marketed by Acima DBuSnDL: dibutyltin dilaurate, Metatin® 712 E marketed by Acima.

The performances of the accelerator systems prepared above are tested in the presence of elastomer compositions capable of crosslinking while cold in the presence of moisture, in a proportion of 10 parts by weight of accelerator system per 100 parts of elastomer composition.

The accelerator systems of Examples 1 to 9 were tested in the presence of the elastomer composition CAF Rhodorseal® 5942 marketed by Rhône-Poulenc, which composition is based on an α,ω-di(hydroxy) polydimethylsiloxane oil with a dynamic viscosity of 25° C. of the order of 70,000 mPa.s, on a crosslinking alkoxysilane, on aminated silanes as adhesion agents, on calcium carbonate, on silica and on a tin catalyst.

The accelerator systems of Examples 10 to 12 were tested in the presence of the elastomer composition Mastic Rhodorsil® 6B, marketed by Rhône-Poulenc, which composition is based on an α,ω-di(hydroxy) polydimethylsiloxane oil with a dynamic viscosity at 25° C. of the order of 70,000 mPa.s, on crosslinking ketiminoxysilanes, on aminated silanes as adhesion agents, on silica and on a tin catalyst.

The accelerator system of Example 3, after storing for 18 months, and that of Example 13 were tested in the presence of the elastomer composition Mastic Rhodorsil® N8, marketed by Rhône-Poulenc, which composition is based on an α,ω-di(hydroxy)polydimethylsiloxane oil with a dynamic viscosity at 25° C. of the order of 50,000 mPa.s, on crosslinking ketiminoxysilanes, on aminated silanes as adhesion agents, on silica and on a tin catalyst.

The accelerator system of Example 14 was tested in the presence of the elastomer composition CAF Rhodorseal® 5761, marketed by Rhône-Poulenc, which composition is based on an α,ω-di(hydroxy)polydimethylsiloxane oil with a dynamic viscosity at 25° C. of the order of 3500 mPa.s, on crosslinking acetoxysilanes, on silica and on a titanium catalyst.

The accelerator system of Example 15 was tested in the presence of the elastomer composition Mastic Rhodorseal® 3B, marketed by Rhône-Poulenc, which composition is based on an α,ω-di(hydroxy)polydimethylsiloxane oil with a dynamic viscosity of 25° C. of the order of 70,000 mPa.s, on crosslinking acetoxysilanes, on silica and on a titanium catalyst. The rate of crosslinking of the elastomer composition in the presence of the accelerator system is estimated according to at least one of the three following methods:

by measuring the time required for demoulding a thick seal with a thickness of 10 mm or 6 mm;

by monitoring the change with time of the Shore A hardness (ASTM D 2240 or ISO R 868 Standard) on the two faces (face in contact with air and enclosed face) of a seal with a thickness of 10 mm;

using a vibrating needle Rapra® curometer marketed by Rapra Technology Ltd., which measures the attenuation in the vibrational amplitude of the needle due to the increases in viscosity and elastic modulus of the elastomer during its crosslinking (the steel needle is immersed in the formulation, the immersed length of the needle being approximately 5 mm, and is then driven by a vertical vibrational movement transmitted by an electrodynamic vibrator; the resistance to movement measured during the crosslinking of the elastomer is expressed in mV); and compared with that of the elastomer composition which is free of the said accelerator system (termed "control").

Time Required for Demoulding

It is observed that the time required for demoulding the elastomer composition:

CAF Rhodorseal® 5942, "control", is 240 h for a seal with a thickness of 10 mm;

CAF Rhodorseal® 5942, accelerated by the system of Example 1, is 24 h for a seal with a thickness of 10 mm;

CAF Rhodorseal® 5942, accelerated by the system of Example 5 or 6, is less than 24 h for a seal with a thickness of 10 mm;

CAF Rhodorseal® 5761, "control", is 130 h for a seal with a thickness of 10 mm;

CAF Rhodorseal® 5761, accelerated by the system of Example 14, is 6 h for a seal with a thickness of 10 mm; the Shore A hardness is 44 (air face) and 43 (enclosed face);

Mastic Rhodorsil® 3B, "control", is 40 h for a seal with a thickness of 6 mm;

Mastic Rhodorsil® 3B, accelerated by the system of Example 15, is 15 h for a seal with a thickness of 6 mm.

Development of the Hardness

Figure 1:
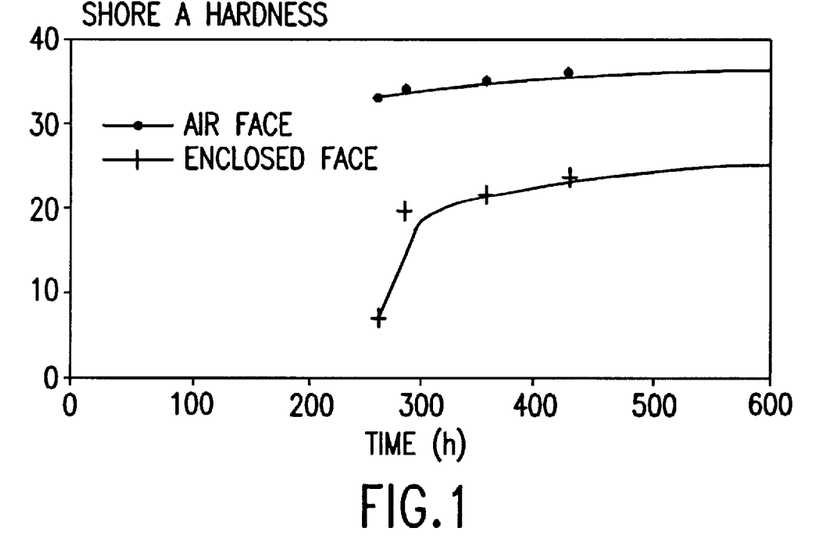
FIGS. 1 to 10 represent the development of the hardness of the chosen elastomer composition accelerated by a system of Examples 1 to 9.
Figure 2:
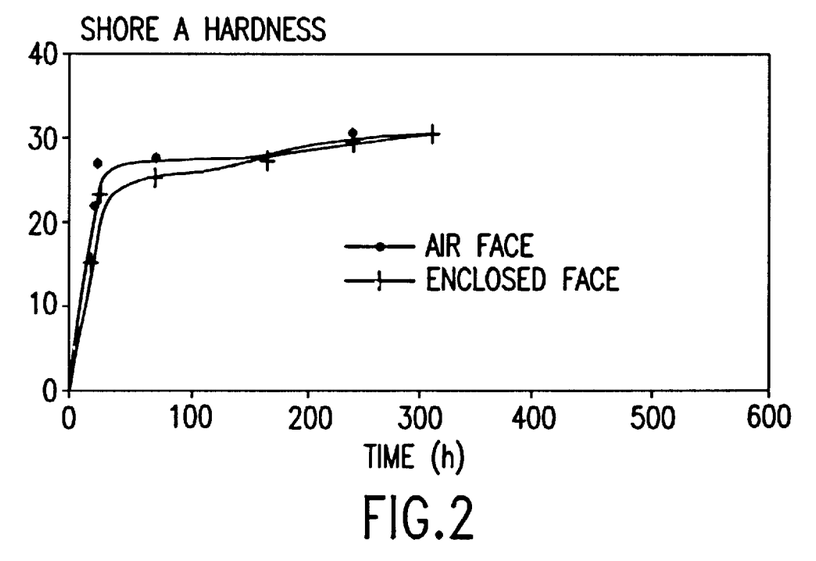
Figure 3:
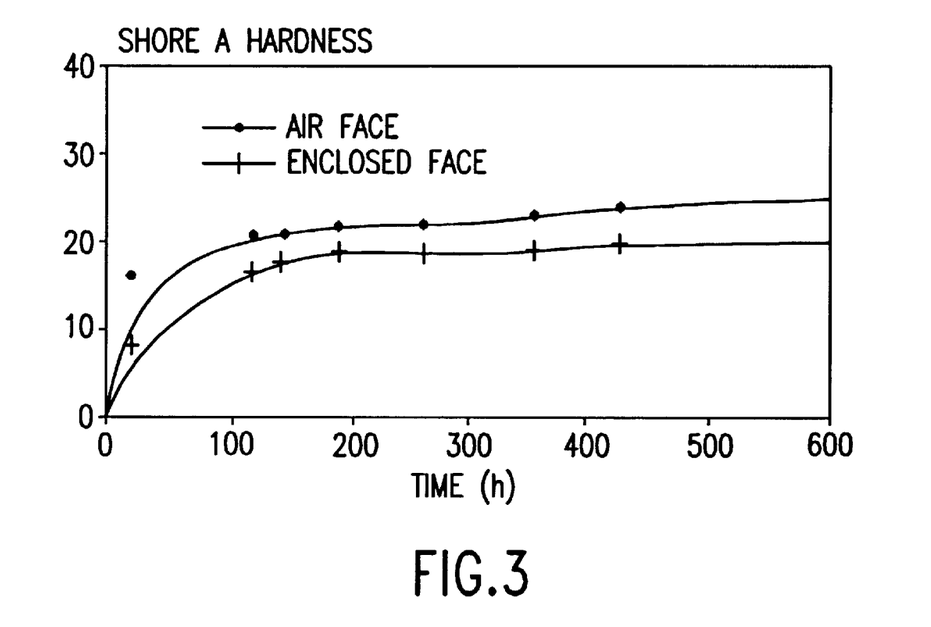
Figure 4:
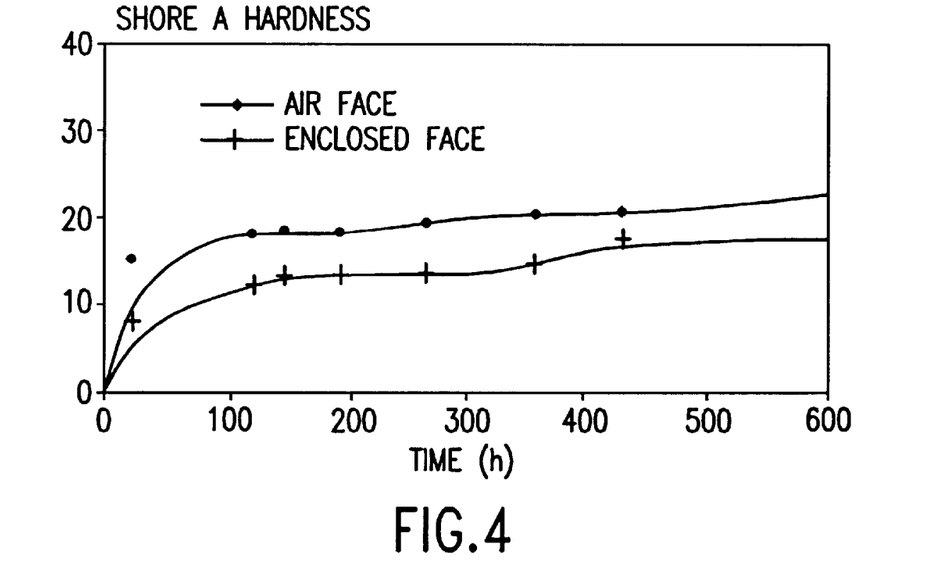
Figure 5:
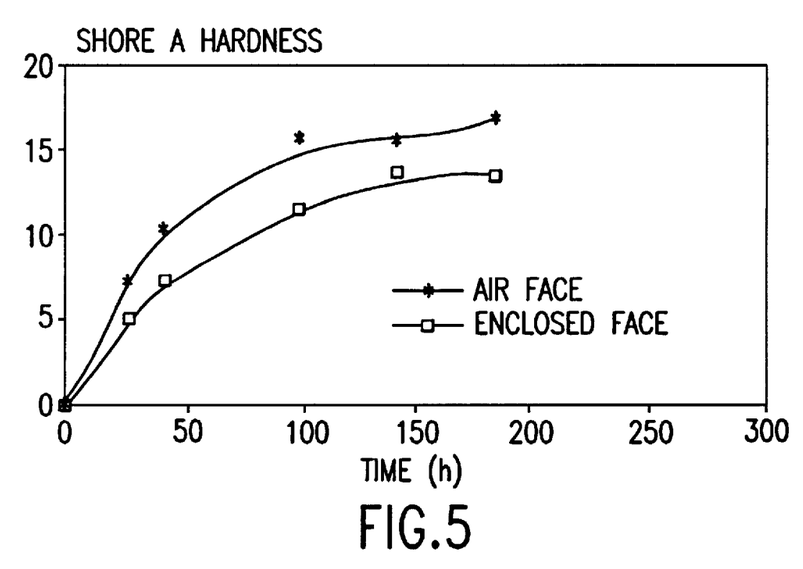

The appended FIGS. 1 to 10 represent the development of the hardness of the chosen elastomer composition accelerated by a system of Examples 1 to 9, according to the following correlation:

| FIG. | Elastomer composition | Accelerator system of |
|---|---|---|
| FIG. 1 | CAF Rhodorseal ®, 5942, "control" | |
| FIG. 2 | CAF Rhodorseal ® 5942 | Example 1 |
| FIG. 3 | CAF Rhodorseal ® 5942 | Example 5 |
| FIG. 4 | CAF Rhodorseal ® 5942 | Example 6 |
| FIG. 5 | CAF Rhodorseal ® 5942 | Example 8* (free water) |

(crosslinking is accelerated but the final product remains tacky and soft)

Figure 6:
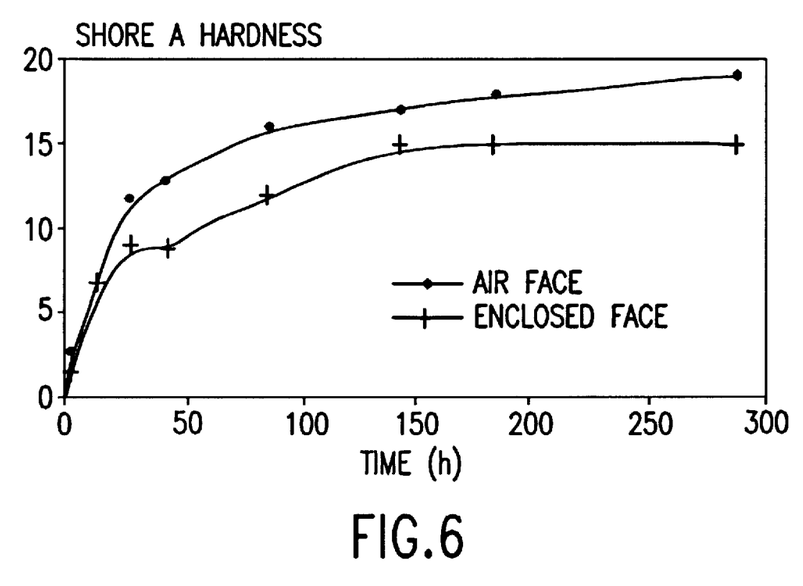

| FIG. 6 | CAF Rhodorseal ® 5942 | Example 9* (free water + cata.) |

(the final elastomer remains tacky and soft; the hardness remains well below that of the "control" elastomer)

Figure 7:
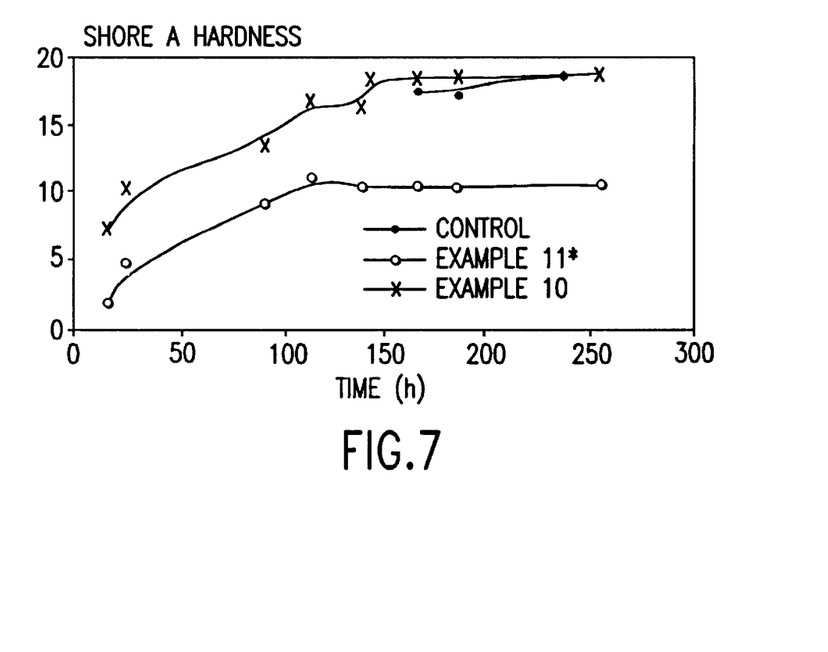
Figure 8:
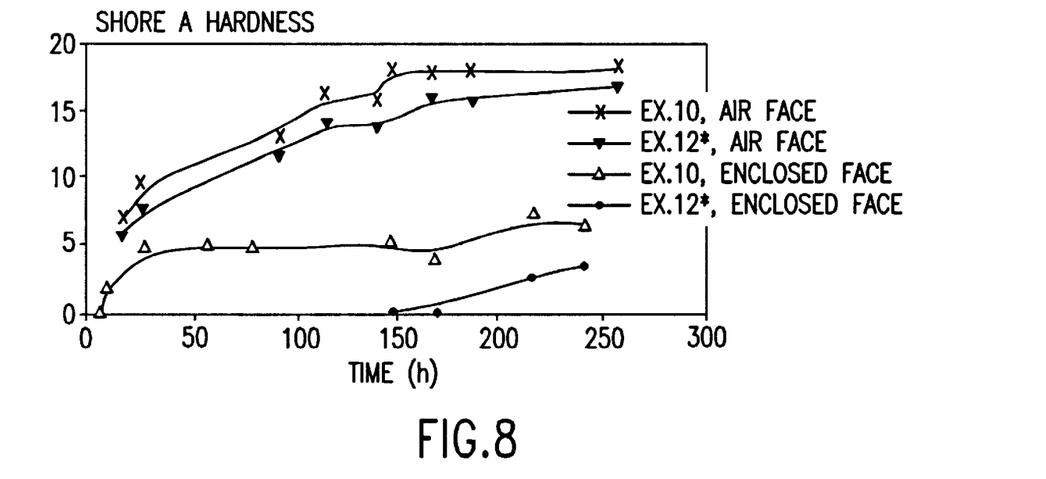
Figure 9:
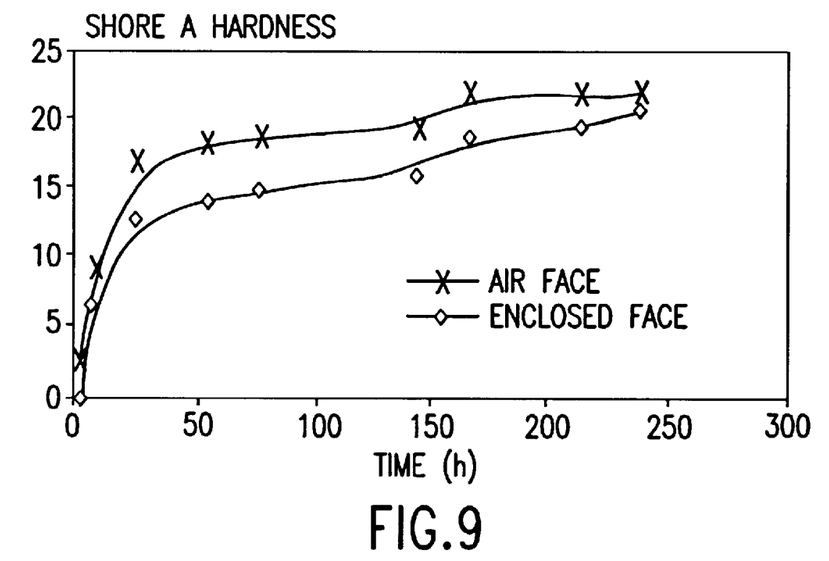
Figure 10:
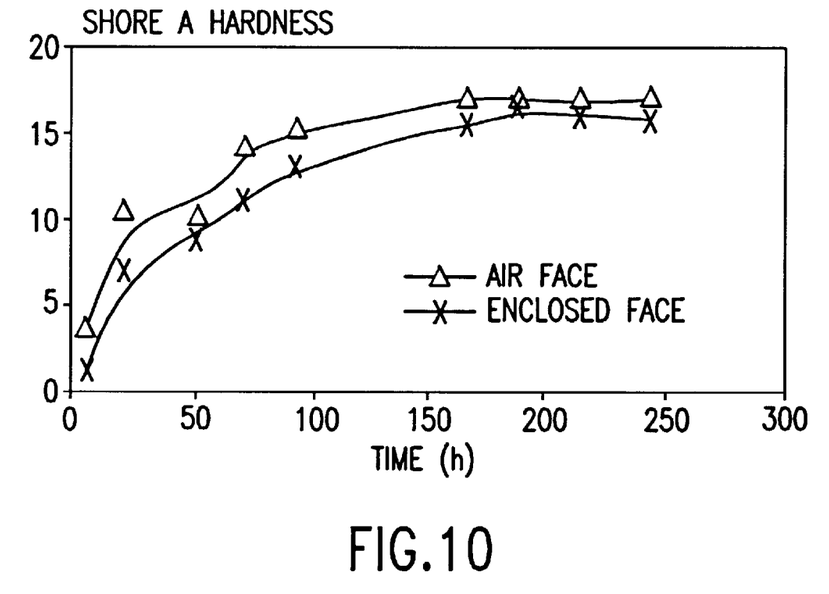

| FIG. | Elastomer composition | Accelerator system of |
|---|---|---|
| FIG. 7 | Mastic Rhodorsil ® 6B, "control" | |
|  | Mastic Rhodorsil ® 6B | Example 10 |
|  | Mastic Rhodorsil ® 6B | Example 11* (without cata.) |
| FIG. 8 | Mastic Rhodorsil ® 6B | Example 10 |
|  | Mastic Rhodorsil ® 6B | Example 12* (hydrogel + cata.) |
| FIG. 9 | Mastic Rhodorsil ® N8 | Example 13 |
| FIG. 10 | Mastic Rhodorsil ® N8 | Example 3 after storing for 8 months |

Measurement with the Curometer

Figure 11:
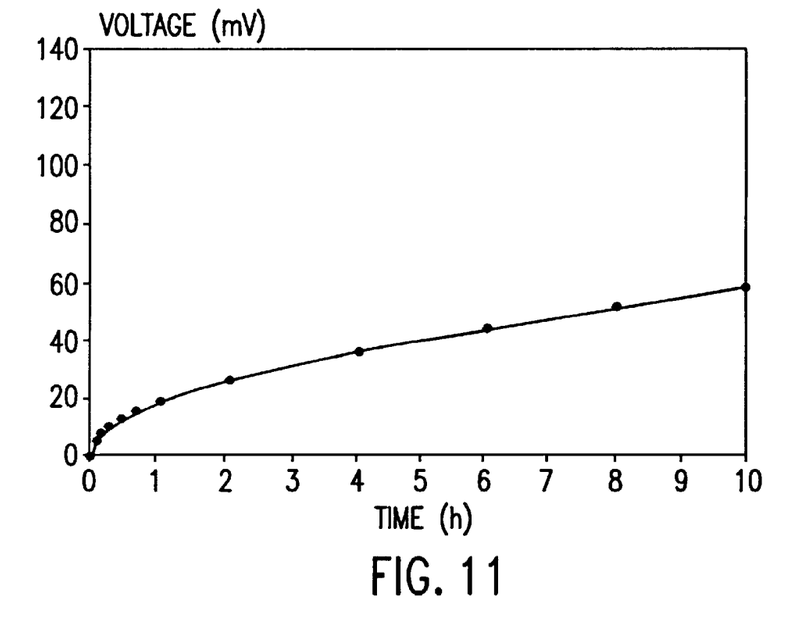
FIGS. 11 to 19 represent the development in the resistance to movement of the chosen elastomer composition accelerated by a system of Examples 2 to 12.
Figure 12:
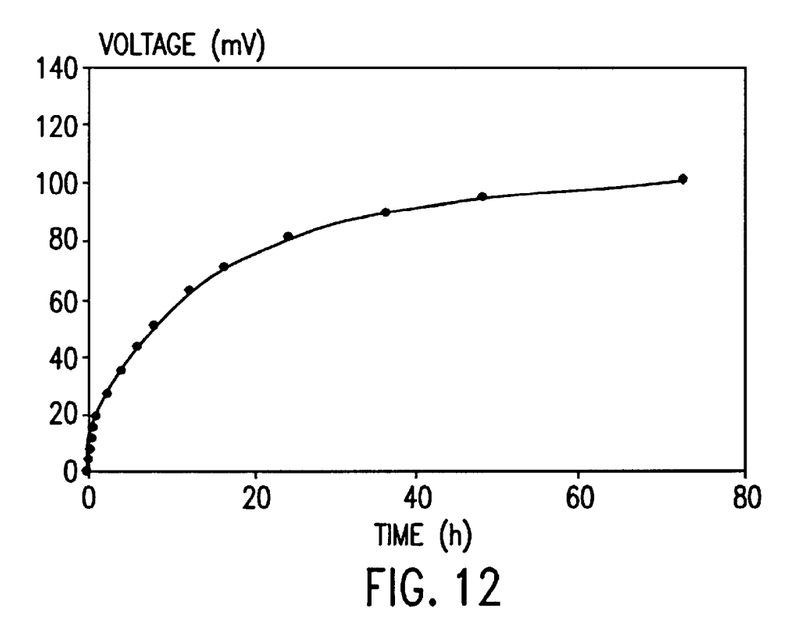
Figure 13:
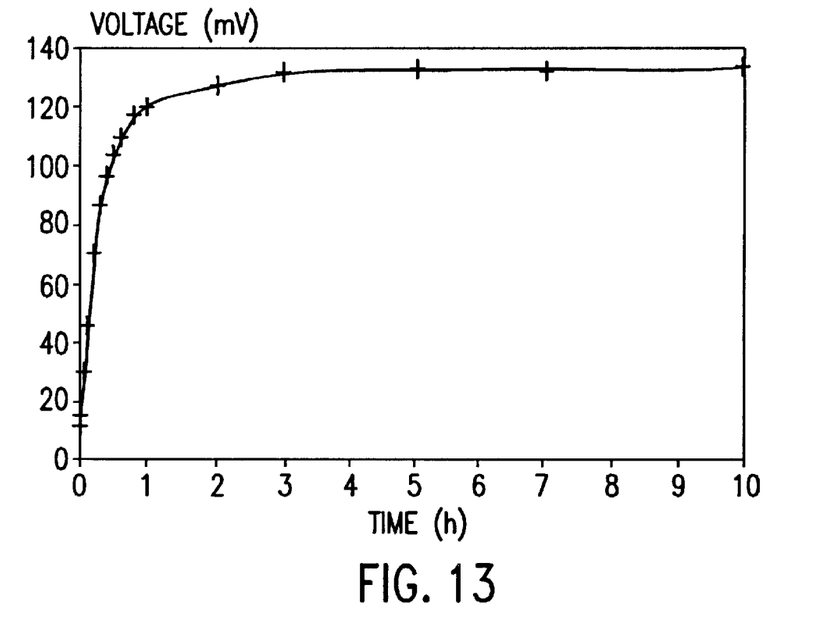
Figure 14:
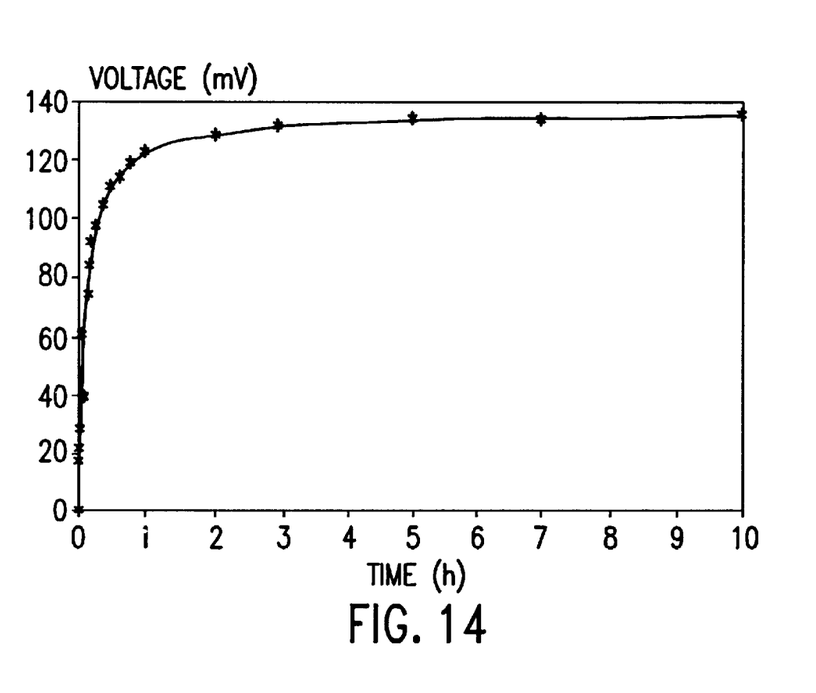
Figure 15:
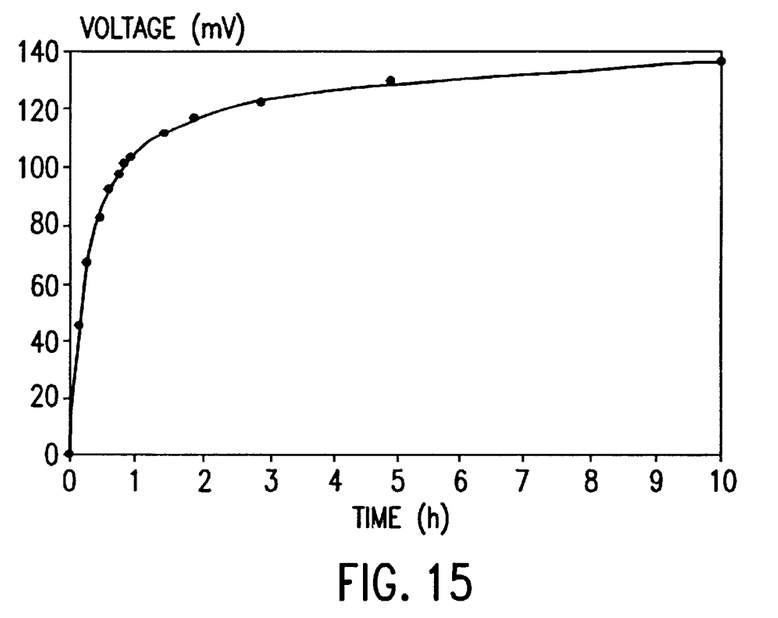
Figure 16:
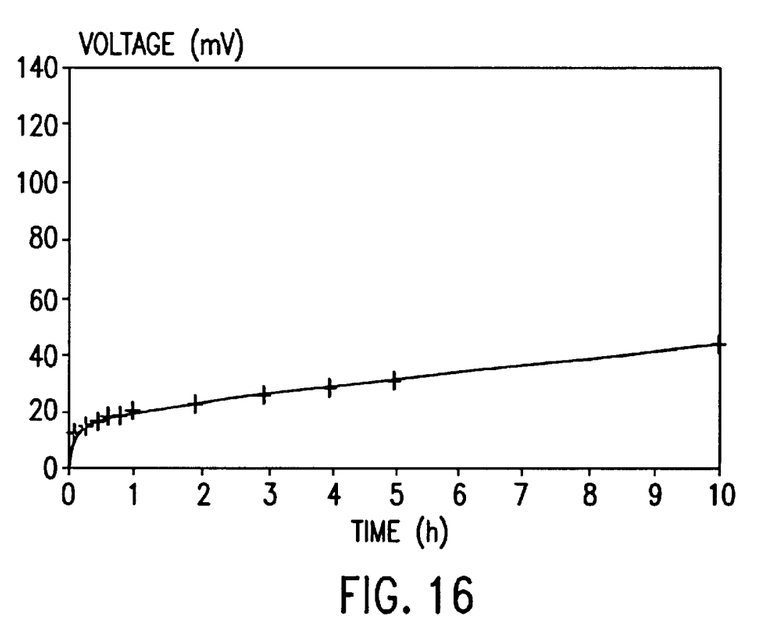

The appended FIGS. 11 to 19 represent the development in the resistance to movement of the chosen elastomer composition accelerated by a system of Examples 2 to 12, according to the following correlation:

| FIG. | Elastomer composition | Accelerator system of |
|---|---|---|
| FIG. 11–12 | CAF Rhodorseal ® 5942, "control" | |
| FIG. 13 | CAF Rhodorseal ® 5942 | Example 2 |
| FIG. 14 | CAF Rhodorseal ® 5942 | Example 3 |
| FIG. 15 | CAF Rhodorseal ® 5942 | Example 4 |
| FIG. 16 | CAF Rhodorseal ® 5942 | Example 7* (without E) |

(no acceleration is observed with respect to the control)

Figure 17:
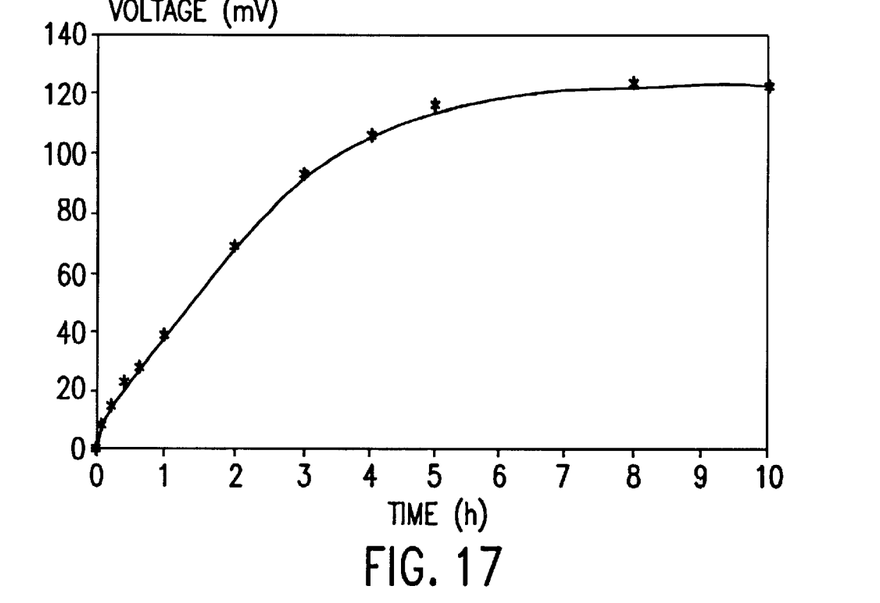
Figure 18:
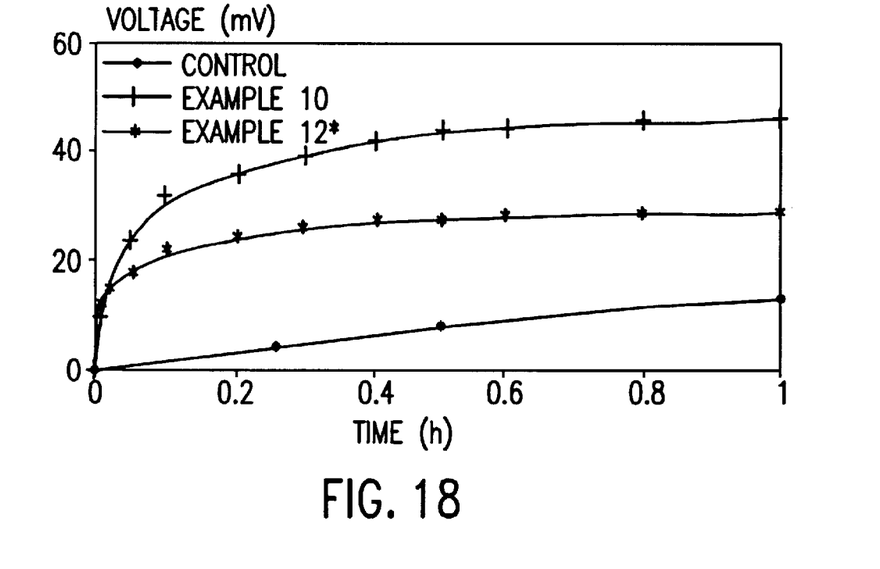
Figure 19:
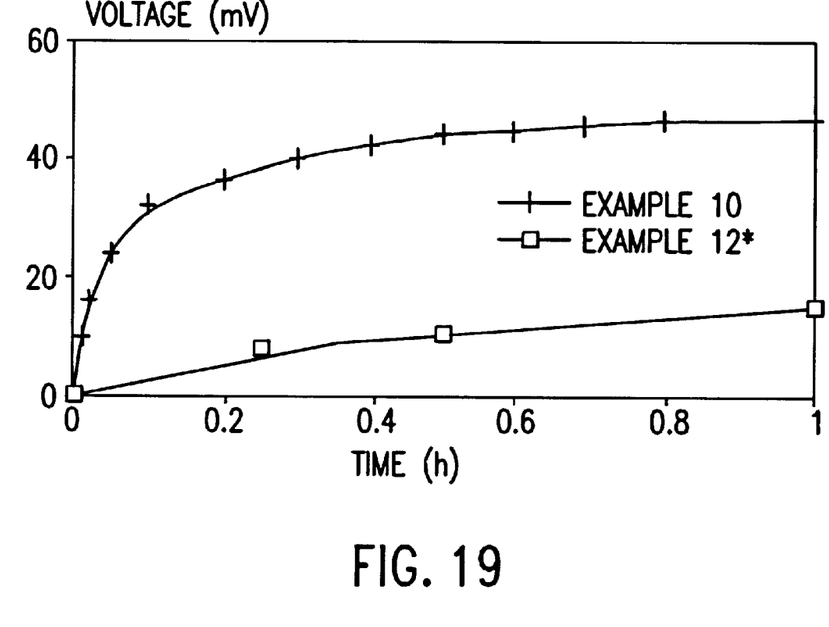

| FIG. 17 | CAF Rhodorseal ® 5942 | Example 1 |
| FIG. 18 | Mastic Rhodorsil ® 6B, "control" | |
|  | Mastic Rhodorsil ® 6B | Example 10 |
|  | Mastic Rhodorsil ® 6B | Example 11* (without cata.) |
| FIG. 19 | Mastic Rhodorsil ® 6B | Example 10 |
|  | Mastic Rhodorsil ® 6B | Example 12* (hydrogel + cata.) |

Measurements carried out using the same accelerator systems stored for eight months give results which are not significantly different from those obtained using the fresh systems.

TABLE 1

| Example | 1 | 2 | 3 | 4 | 5 | 6 | 7* | 8* | 9* |
|---|---|---|---|---|---|---|---|---|---|
| Inorganic compound E (% by weight) | | | | | | | | | |
| •$Na_2B_4O_7 \cdot 10H_2O$ | 15 | | | | | | | | |
| •12% MS | | 36 | | | | | | | |
| •22% NS | | | 31 | | | | | | |
| •silica gel | | | | 31 | | | | | |
| •$Na_2HPO_4 \cdot 12H_2O$ | | | | | 11 | | | | |
| •$Na_2CO_3 \cdot 10H_2O$ | | | | | | 10.5 | | | |
| Free water (% by weight) | | | | | | | | 7 | 7 |
| Silicone diluent (% by weight) | | | | | | | | | |
| •47 V 30,000 | 47 | | | | 86 | 86.5 | 97 | 89 | 88 |
| •47 V 100 | | 61 | 66 | 66 | | | | | |
| •48 V 3500 | | | | | | | | | |
| Silica (% by weight) | 2 | 2 | 2 | 2 | 2 | 2 | 2 | 4 | 4 |
| Ca carbonate (% by weight) | 35 | | | | | | | | |

TABLE 1-continued

| Example | 1 | 2 | 3 | 4 | 5 | 6 | 7* | 8* | 9* |
|---|---|---|---|---|---|---|---|---|---|
| Catalyst (% by weight) | | | | | | | | | |
| •DOctSnDL | 1 | 1 | 1 | 1 | 1 | 1 | 1 | 0 | 1 |

*comparative examples

TABLE 2

| Example | 10 | 11* | 12* | 13 | 14 | 15 |
|---|---|---|---|---|---|---|
| Inorganic compound E (% by weight) | | | | | | |
| •$Na_2B_4O_7 \cdot 10H_2O$ | | | | 15 | 14.8 | 21 |
| •12% MS | | | | | | |
| •22% NS | 32 | 32 | | | | |
| •silica gel | | | | | | |
| •$Na_2HPO_4 \cdot 12H_2O$ | | | | | | |
| •$Na_2CO_3 \cdot 10H_2O$ | | | | | | |
| Aqua Keep ® (% by weight) | | | 0.1 | | | |
| Free Water (% by weight) | | | 7 | | | |
| Silicone diluent (% b weight) | | | | | | |
| •47 V 30,000 | | | 87.9 | | 82.9 | 76.3 |
| •47 V 100 | | | | | | |
| •48 V 3500 | 65 | 68 | | 82 | | |
| Silica (% by weight) | | 4 | | | 2.5 | 2.5 |
| Catalyst (% by weight) | | | | | | |
| •DOctSnDL | 3 | 0 | 1 | | | |
| •DBuSnDL | | | | 3 | 0.8 | |
| Bu titanate | | | | | | 0.2 |

*comparative examples

We claim:

1. An accelerator system for the cold crosslinking of polymers which harden on exposure to moisture by hydrolysis/condensation, said accelerator system comprising in parts by weight:

(C) x parts by weight of a catalyst for crosslinking the said polymers by polycondensation, x ranging from 0.01 to 10;

(E) Y parts by weight of at least one solid inorganic compound containing an amount y of water in the form of water of hydration and/or water adsorbed by capillary condensation, the amount y ranging from 0.5 to 40 parts by weight of said accelerator system, and the amount y representing up to 70% of the weight of said solid inorganic compound;

(F) z parts by weight of fillers, z ranging from 0 to 50;

(D) 100-(x+Y+z) parts by weight of a diluent or of a solvent of the said catalyst (C), the diluent or solvent having a dynamic viscosity at 25° C. of about 50 to about 200,000 mPa.s.;

the respective amounts of the four constituents (C), (E), (F) and (D) being such that the accelerator system obtained exists in the form of a manipulable paste and is capable of accelerating cold crosslinking of polymers which harden on exposure to moisture by hydrolysis/condensation.

2. The accelerator system according to claim 1, wherein x ranges from 0.1 to 5; y ranges from 3 to 20; and z ranges from 1 to 30.

3. The accelerator system according to claim 1, wherein the catalyst (C) is based on tin, titanium, zirconium, manganese or lead.

4. The accelerator system according to claim 1, wherein said solid inorganic compound (E) is a hydrated crystalline alkali metal or alkaline-earth metal aluminosilicate, a hydrated silica gel or a hydrated inorganic salt containing water of crystallization.

5. The accelerator system according to claim 4, wherein said solid inorganic compound (E) is $Na_2B_4O_7.10H_2O$ containing 47% by weight of water, $Na_2HPO_4.12H_2O$ containing 60% by weight of water or $Na_2CO_3.10H_2O$ containing 63% of water.

6. The accelerator system according to claim 1, wherein said diluent or solvent (D) is selected from the group consisting of α,ω-bis(triorganosiloxy) polydiorganosiloxanes, aromatic hydrocarbons, cycloaliphatic hydrocarbons, aliphatic hydrocarbons, halogenated aromatic hydrocarbons, halogenated cycloaliphatic hydrocarbons, halogenated aliphatic hydrocarbons, ketones, cycloaliphatic ketones, and esters.

7. The accelerator system according to claim 1, wherein said fillers (F) comprise silica.

* * * * *